(12) United States Patent
Yoshino

(10) Patent No.: US 11,724,276 B2
(45) Date of Patent: Aug. 15, 2023

(54) COATING SYSTEM INCLUDING COATING ROBOT AND OPERATION ROBOT

(71) Applicant: KABUSHIKI KAISHA YASKAWA DENKI, Kitakyushu (JP)

(72) Inventor: Katsuhiko Yoshino, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 200 days.

(21) Appl. No.: 15/896,074

(22) Filed: Feb. 14, 2018

(65) Prior Publication Data

US 2018/0169690 A1 Jun. 21, 2018

Related U.S. Application Data

(63) Continuation of application No. PCT/JP2015/073142, filed on Aug. 18, 2015.

(51) Int. Cl.
| | |
|---|---|
| *B05B 13/04* | (2006.01) |
| *B05B 16/00* | (2018.01) |
| *B25J 9/00* | (2006.01) |
| *B25J 5/02* | (2006.01) |
| *B05B 13/02* | (2006.01) |

(Continued)

(52) U.S. Cl.
CPC ...... *B05B 13/0452* (2013.01); *B05B 13/0292* (2013.01); *B05B 13/0431* (2013.01); *B05B 13/0457* (2013.01); *B25J 5/02* (2013.01); *B25J 9/0084* (2013.01); *B25J 9/0093* (2013.01); *B25J 11/0075* (2013.01); *B05B 13/0494* (2013.01); *B05B 16/95* (2018.02); *B05C 9/04* (2013.01);

(Continued)

(58) Field of Classification Search
CPC ............................ B05B 16/20; B05B 13/0452
See application file for complete search history.

(56) References Cited

U.S. PATENT DOCUMENTS

| | | | | |
|---|---|---|---|---|
| 4,768,462 A | * | 9/1988 | Kuronaga | B05B 13/0452 118/314 |
| 4,869,935 A | * | 9/1989 | Hayashi | B05C 9/08 427/8 |

(Continued)

FOREIGN PATENT DOCUMENTS

| | | |
|---|---|---|
| JP | 08-164349 | 6/1996 |
| JP | 2007-518556 | 7/2007 |

(Continued)

OTHER PUBLICATIONS

International Search Report for corresponding International Application No. PCT/JP2015/073142, dated Nov. 17, 2015.

(Continued)

*Primary Examiner* — Karl Kurple
(74) *Attorney, Agent, or Firm* — Mori & Ward, LLP

(57) ABSTRACT

A coating system includes a coating robot and an operation robot. The coating robot has a height and is mounted in a coating booth to coat a workpiece while the workpiece is conveyed in the coating booth in a conveyance direction substantially perpendicular to a height direction. The workpiece including a body and a movable part movable with respect to the body. The operation robot is disposed in the coating booth below the coating robot in the height direction. The operation robot is movable in the coating booth in the conveyance direction and is configured to move the movable part of the workpiece.

9 Claims, 11 Drawing Sheets

(51) Int. Cl.
*B25J 11/00* (2006.01)
*B05C 9/04* (2006.01)

(52) U.S. Cl.
CPC .............. *Y10S 55/46* (2013.01); *Y10S 118/07* (2013.01); *Y10S 239/14* (2013.01); *Y10S 901/43* (2013.01)

(56) References Cited

U.S. PATENT DOCUMENTS

| | | | | |
|---|---|---|---|---|
| 5,014,644 | A * | 5/1991 | Yamamoto | B05B 13/0292 118/314 |
| 5,429,682 | A * | 7/1995 | Harlow, Jr. | B05B 7/0815 118/681 |
| 5,989,643 | A * | 11/1999 | Nakagawa | B05B 13/0452 427/424 |
| 2004/0107900 | A1* | 6/2004 | Clifford | B05B 13/0431 118/305 |
| 2004/0115360 | A1* | 6/2004 | Clifford | B05B 13/0431 427/8 |
| 2006/0292308 | A1* | 12/2006 | Clifford | B25J 9/0093 427/427.2 |
| 2007/0166463 | A1* | 7/2007 | Kelly | B05B 14/468 427/345 |
| 2008/0020135 | A1* | 1/2008 | Fouvet | B05B 13/0292 427/181 |
| 2009/0320753 | A1 | 12/2009 | Yoshino et al. | |
| 2011/0166708 | A1* | 7/2011 | Herre | B25J 9/0009 700/258 |
| 2012/0138207 | A1* | 6/2012 | Ortlieb | B05D 5/005 156/64 |
| 2012/0145075 | A1* | 6/2012 | Takahashi | B05B 14/465 118/323 |
| 2012/0191243 | A1* | 7/2012 | Haas | B05B 13/0431 700/245 |
| 2012/0325142 | A1* | 12/2012 | Takahashi | B05B 16/40 118/323 |
| 2013/0034660 | A1* | 2/2013 | Koyanagi | B05B 13/0292 427/424 |
| 2014/0069335 | A1* | 3/2014 | Bania | B05B 16/40 118/696 |
| 2014/0109830 | A1* | 4/2014 | Herre | B05B 5/08 118/712 |
| 2014/0135986 | A1* | 5/2014 | Kanehara | B25J 9/1671 700/257 |
| 2014/0220249 | A1* | 8/2014 | Rouaud | B05B 12/02 427/256 |
| 2018/0221904 | A1* | 8/2018 | Yoshino | B25J 9/046 |

FOREIGN PATENT DOCUMENTS

| | | |
|---|---|---|
| JP | 2014-61589 | 4/2014 |
| WO | 2008/108401 | 9/2008 |

OTHER PUBLICATIONS

Written Opinion for corresponding International Application No. PCT/JP2015/073142, dated Nov. 17, 2015.

* cited by examiner

COATING SYSTEM INCLUDING COATING ROBOT AND OPERATION ROBOT

CROSS-REFERENCE TO RELATED APPLICATIONS

The present application is a continuation application of International Application No. PCT/JP2015/073142, filed Aug. 18, 2015. The contents of this application are incorporated herein by reference in their entirety.

BACKGROUND

FIELD OF THE INVENTION

The embodiments disclosed herein relate to a coating system and a coating method.

DISCUSSION OF THE BACKGROUND

WO/2008/108401 discloses a coating system that conveys an object such as a vehicle on a conveyor into a coating booth having a space isolated from the environment and that subjects the conveyed object to coating using movable robots.

In the coating booth, a first travel guide rail and a second travel guide rail different in height from the first travel guide rail are aligned along the conveyor. One of the movable robots is located at the first travel guide rail, and another one of the movable robots is located at the second travel guide rail.

SUMMARY

According to one aspect of the present disclosure, a coating system includes a coating robot and an operation robot. The coating robot has a height and is mounted in a coating booth to coat a workpiece while the workpiece is conveyed in the coating booth in a conveyance direction substantially perpendicular to a height direction. The workpiece including a body and a movable part movable with respect to the body. The operation robot is disposed in the coating booth below the coating robot in the height direction. The operation robot is movable in the coating booth in the conveyance direction and is configured to move the movable part of the workpiece.

According to another aspect of the present disclosure, a coating method includes controlling an operation robot provided in a coating booth to move a movable part of a workpiece with respect to a body of the workpiece while the workpiece is conveyed in the coating booth in a conveyance direction. The coating method includes controlling the operation robot to follow the workpiece while the workpiece is conveyed in a state where the movable part is moved with respect to the body. The coating method includes controlling a coating robot to coat the workpiece exposed through the movable part while the workpiece is conveyed in a state where the coating robot is mounted in the coating booth such that the operation robot is below the coating robot in a height direction along a height of the coating robot. The height direction is substantially perpendicular to the conveyance direction.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
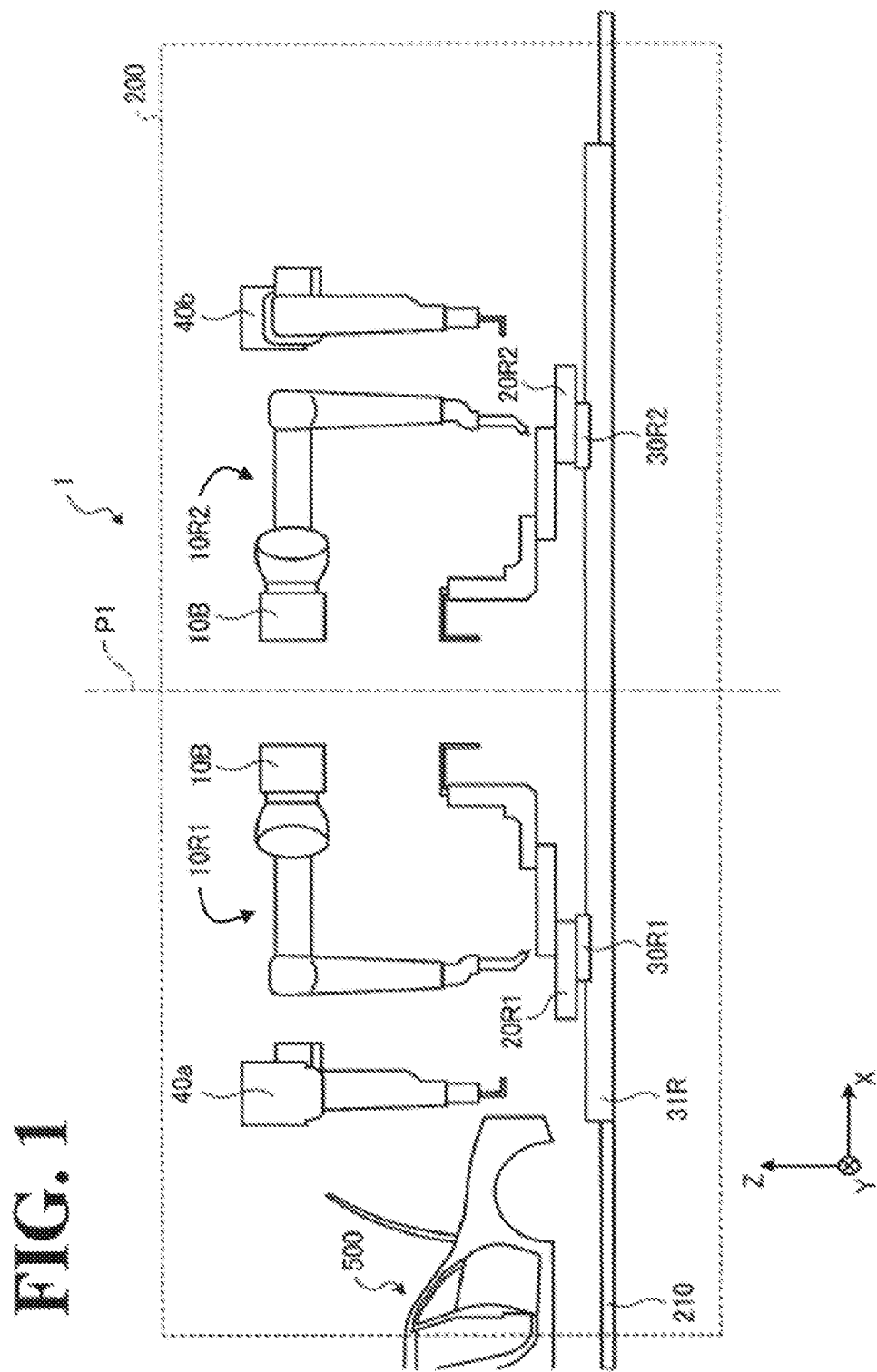
FIG. 1 is a schematic side view of a coating system according to a first embodiment.

The embodiments will now be described with reference to the accompanying drawings, wherein like reference numerals designate corresponding or identical elements throughout the various drawings.

It is noted that the following embodiments are provided for exemplary purposes only and are not intended in a limiting sense. For example, while in the following description a vehicle, such as an automobile, is exemplified as an object to be coated, a vehicle is not intended in a limiting sense.

In the following description, the terms "parallel", "perpendicular", "vertical", "same", "identical", and "symmetric" may occasionally be used to not only mean "parallel", "perpendicular", "vertical", "same", "identical", and "symmetric", respectively, in a strict sense but also mean "parallel", "perpendicular", "vertical", "same", "identical", and "symmetric", respectively, in an approximate sense. That is, these terms are used taking into consideration production-related and/or installation-related tolerances and errors.

First Embodiment

A coating system 1 according to the first embodiment will be described by referring to FIGS. 1 and 2. FIG. 1 is a schematic side view of the coating system 1 according to the first embodiment, and FIG. 2 is a top view of the coating system 1 according to the first embodiment.

Figure 2:
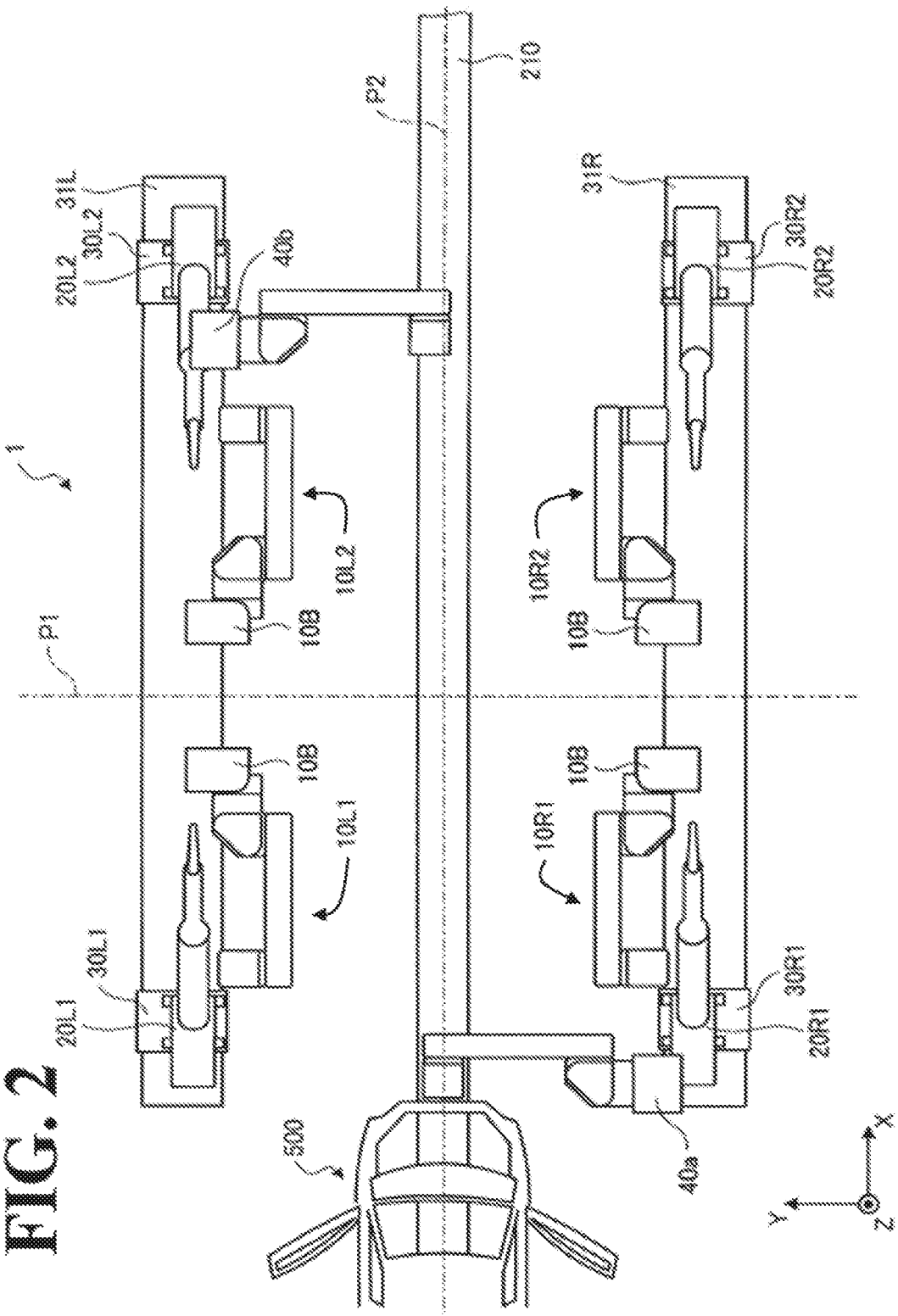
FIG. 2 is a top view of the coating system according to the first embodiment.

Specifically, FIG. 1 is a view of the coating system 1 in the Y axis positive direction illustrated in FIG. 2. It is noted that FIG. 1 omits illustration of those robots and devices that exist behind the illustrated robots and devices in the Y axis positive direction illustrated in FIG. 2. The robots illustrated in FIGS. 1 and 2 will be detailed later by referring to FIGS. 4 and 5.

In order to facilitate the understanding of the description, FIGS. 1 and 2 illustrate a three-dimensional orthogonal coordinate system including a Z axis with its vertically upward direction being assumed the positive direction. This orthogonal coordinate system may also be illustrated in some other drawings referred to in the following description.

Also in the following description, the conveyance direction in which a conveyor 210 conveys a workpiece (which is, in this embodiment, the X axis positive direction) will be referred to as "front", the direction opposite to the front will be referred to as "rear", the direction to the right for a workpiece oriented in the conveyance direction will be referred to as "right", and the direction to the left for a workpiece oriented in the conveyance direction will be referred to as "left". Also in the following description, a surface passing through the center of the conveyor 210 in its conveyance direction, as seen in a top view of the coating system 1, will be referred to as symmetry surface P2 (see FIG. 2). Also in the following description, a surface passing through an intermediate position between a pair of coating robots 10R1 and 10R2 and an intermediate position between a pair of coating robots 10L1 and 10L2, as seen in a top view of the coating system 1, will be referred to as symmetry surface P1 (see FIGS. 1 and 2).

As illustrated in FIGS. 1 and 2, a plurality of robots are provided in a coating booth 200. The robots include coating robots 10, movable opener robots 20, and fixed opener robots 40. These robots and certain other devices will bear an identification character next to their respective reference numerals.

For example, a device disposed to the right of the conveyor 210 bears "R", and a device disposed to the left of the conveyor 210 bears "L". Where there are a plurality of identical or equivalent robots and/or devices on the same side of the conveyor 210, such robots and/or devices bear a numerical designation next to the identification character. For example, a coating robot 10L2 is one of a plurality of coating robots 10 disposed to the left of the conveyor 210, and in the first embodiment illustrated in FIG. 2, refers to the coating robot 10 disposed on the downstream side in the conveyance direction.

A workpiece 500 is symmetric to itself with respect to the symmetry surface P2. The symmetricity of the workpiece 500, however, is not intended in a strict sense; any other shape is possible insofar as the robots to the left of the workpiece 500 and the robots to the right of the workpiece 500 are able to perform similar operations.

The coating robots 10L1 and 10L2 and movable opener robots 20L1 and 20L2 work on the left side of the workpiece 500. The coating robots 10R1 and 10R2 and movable opener robots 20R1 and 20R2 work on the right side of the workpiece 500. Fixed opener robots 40a and 40b operate a front openable member and a rear openable member respectively located a front portion and a rear portion of the workpiece 500.

As illustrated in FIG. 2, since the workpiece 500 is symmetric to itself with respect to the symmetry surface P2, the robots facing each other across the conveyor 210 make left-right symmetric movements to perform coating and other operations on the workpiece 500. Specifically, the movable opener robots 20R1 and 20L1 perform left-right symmetric movements; the travel driving mechanisms 30R1 and 30L1 perform left-right symmetric movements; the coating robots 10R1 and 10L1 perform left-right symmetric movements; the coating robots 10R2 and 10L2 perform left-right symmetric movements; travel driving mechanisms 30R2 and 30L2 perform left-right symmetric movements; and the movable opener robots 20R2 and 20L2 perform left-right symmetric movements.

The robots and other devices disposed in the coating booth 200 (see FIG. 1) will be described below. In the coating booth 200, the conveyor 210, the travel driving mechanisms 30, and a pair of guides 31 are disposed. The coating booth 200 is a coating-use chamber having a space isolated from the environment.

On the floor of the coating booth 200, the conveyor 210 is disposed. The conveyor 210 conveys the workpiece 500, which is an object to be coated, in a predetermined conveyance direction (in the X axis positive direction in the embodiment of FIGS. 1 and 2) at a predetermined speed. While the workpiece 500 is being conveyed, the workpiece 500 is kept secured to a movable portion the conveyor 210 with jigs or similar devices, not illustrated.

The pair of guides 31 are disposed on the floor of the conveyor 210 and are symmetric to each other with respect to the symmetry surface P2 (see FIG. 2). As illustrated in FIG. 2, a right guide 31R is disposed to the right of the conveyor 210, and a left guide 31L is disposed to the left of the conveyor 210. The travel driving mechanisms 30 are capable of traveling along the guides 31. That is, the travel driving mechanisms 30 are capable of traveling both in the X axis positive direction and the X axis negative direction illustrated in FIG. 2. Also, the travel driving mechanisms 30 support the movable opener robots 20.

As illustrated in FIG. 2, there are two pairs of travel driving mechanisms 30, each pair being disposed on each guide 31. Specifically, the travel driving mechanisms 30R1 and 30R2 are disposed on the right guide 31R, and the travel driving mechanisms 30L1 and 30L2 are disposed on the left guide 31L. Each of the travel driving mechanisms 30 is capable of traveling independently. That is, the movable opener robot 20 supported by the travel driving mechanism 30 is movable independently. In the following description, the movable opener robot 20 may occasionally be intended to include the travel driving mechanism 30.

The coating robots 10 coat the workpiece 500. A non-limiting example of each coating robot 10 is a six-axis multi-articular robot. The coating robots 10 are fixed to a wall and/or the ceiling of the coating booth 200. Specifically, the coating robots 10 are fixed to columns or beams surrounding the coating booth 200, and the walls and ceiling of the coating booth 200 are disposed at inner positions than the positions where the coating robots 10 are secured.

As illustrated in FIGS. 1 and 2, the pair of coating robots 10R1 and 10R2 have their first axes (see A11 illustrated in FIG. 4) disposed on a common line.

The pair of coating robots 10R1 and 10R2 have first arms (see 11 illustrated in FIG. 4) respectively turnable about the first axes and extendable in directions away from each other. This configuration of the pair of coating robots 10R1 and 10R2 also applies in the pair of coating robots 10L1 and 10L2 illustrated in FIG. 2.

Arranging the coating robots 10 in the above-described manner ensures higher density of robots. With higher density of robots, the footprint of the coating booth 200 (which is the area in a top view of the coating booth 200) decreases. In this respect, the running cost of the coating booth 200 is largely dependent upon maintaining coating environments such as air conditioning and is proportional to the footprint of the coating booth 200. Therefore, achieving higher density of robots minimizes the running cost.

As illustrated in FIG. 1, the pair of coating robots 10R1 and 10R2 have symmetric "arm configurations" that are symmetric to each other with respect to the symmetry surface P1, which is at the intermediate position between the pair of coating robots 10R1 and 10R2. As used herein, the term "arm configuration" refers to the arrangement of the axes about which the arms turn and/or rotate. The arrangement of the axes includes angles between adjacent axes and distances between adjacent axes.

Specifically, when arm configurations are symmetric to each other, the arms may be different from each other in shape and/or appearance. That is, robots that are symmetric to each other in the arrangement of the axes are referred to as having symmetric arm configurations symmetric to each other, even if the arms of the robots are different from each other in shape and/or appearance. Similarly, robots that are identical to each other in the arrangement of the axes are referred to as having identical arm configurations, even if the arms of the robots are different from each other in shape and/or appearance.

Thus, using robots having symmetric arm configurations symmetric to each other ensures that teaching data can be shared between the robots by reversing the teaching data. This minimizes the cost of creating teaching data, resulting in minimized production cost of the robots. This configuration of the pair of coating robots 10R1 and 10R2 also applies in the pair of coating robots 10L1 and 10L2 illustrated in FIG. 2.

As illustrated in FIG. 2, there are two pairs of coating robots 10, each pair being symmetric to the other pair with respect to the symmetry surface P2. Specifically, the coating robots 10R1 and 10L1 face each other across the symmetry surface P2 and have symmetric arm configurations symmetric to each other with respect to the symmetry surface P2, and the coating robots 10R2 and 10L2 face each other across the symmetry surface P2 and have symmetric arm configurations symmetric to each other with respect to the symmetry surface P2.

As described above, the pair of coating robots 10R1 and 10R2 have symmetric arm configurations symmetric to each other with respect to the symmetry surface P1, and the coating robots 10L1 and 10L2 have symmetric arm configurations symmetric to each other with respect to the symmetry surface P1. As can be seen from this arrangement, the coating robots 10 that are diagonally opposite to each other as illustrated in FIG. 2 have identical arm configurations. That is, the coating robot 10R1 and the coating robot 10L2 have identical arm configurations, and the coating robot 10R2 and the coating robot 10L1 have identical arm configurations.

Arranging the coating robots 10 in this manner ensures that the workpiece 500, which is symmetric to itself with respect to the symmetry surface P2, can be coated more efficiently while the above-described teaching data can be shared and/or re-used, with or without modifications, between the coating robots 10. For example, by reversing the orientation of the Y axis in the teaching data of the coating robot 10R1, this teaching data can be used as teaching data of the coating robot 10L1. This also applies in the coating robot 10R2 and the coating robot 10L2.

The movable opener robots 20 operate openable members (movable members movable with respect to bodies of the workpiece 500) of the workpiece 500. Specifically, each movable opener robot 20 is a three-axis multi-articular robot having a two-axis arm extendable and contractable in horizontal directions and a vertical movement axis. Using the two-axis arm and the vertical movement axis, the movable opener robot 20 opens and closes the openable members (side doors) of the workpiece 500. As described above, the movable opener robot 20 is supported by the travel driving mechanism 30, which makes the movable opener robot 20 movable along the guide 31, that is, movable in the conveyance direction of the conveyor 210.

As illustrated in FIG. 1, the movable opener robots 20 are disposed below the coating robots 10. Arranging the movable opener robots 20 below the coating robots 10 makes it difficult for the coating robots 10 and the movable opener robots 20 to interference with each other. As illustrated in FIG. 1, coating robots 10 are preferably disposed at positions higher than highest reachable points for the movable opener robots 20.

The coating robot 10 is more complicated in structure and heavier in weight than the movable opener robot 20. If the coating robot 10 were made movable, it would be necessary to make the travel driving mechanism 30 and the guide 31 more load-resistant and more complicated in structure. In the first embodiment, however, it is the comparatively lightweight movable opener robot 20 that is movable, on the travel driving mechanism 30. This configuration simplifies the travel driving mechanism 30 and the guide 31 in structure, minimizing the cost of the coating system 1.

The fixed opener robots 40 operate the front openable member and the rear openable member of the workpiece 500. A non-limiting example of each fixed opener robot 40 is a six-axis multi-articular robot, similarly to the coating robots 10. Each fixed opener robot 40 is fixed to a wall or the ceiling of the coating booth 200 and has a first arm (see 11 illustrated in FIG. 4) that is turnable about the first axis and that extends toward the conveyor 210 along the Y axis illustrated in FIG. 1. Using the first arm, each fixed opener robot 40 opens and closes a hood 520 (see FIG. 3) and a tail gate (see 530 illustrated in FIG. 3), which are non-limiting examples of the front openable member and the rear openable member of the workpiece 500.

Specifically, as illustrated in FIGS. 1 and 2, the fixed opener robot 40a is disposed at an upstream position in the conveyance direction, and opens and closes the tail gate 530 of the workpiece 500. The fixed opener robot 40b is disposed at a downstream position in the conveyance direction, and opens and closes the hood 520 of the workpiece 500. Also as illustrated in FIGS. 1 and 2, the coating robots 10R1 and 10R2 are disposed between the fixed opener robots 40a and 40b in the conveyance direction.

The fixed opener robots 40a and 40b at least partially overlap the lengths of the guides 31R and 31L in the conveyance direction, and the first arms (see 11 illustrated in FIG. 4) of the fixed opener robots 40a and 40b extend toward the conveyor 210 along the Y axis illustrated in FIG. 1. Arranging the fixed opener robots 40a and 40b in this manner shortens the length of the coating booth 200.

The fixed opener robot 40a engages with the tail gate 530 in closed state and opens the tail gate 530 by changing the postures of the arms of the fixed opener robot 40a. Then, the fixed opener robot 40a holds the open tail gate 530 while changing the postures of the arms so that the arms follow the workpiece 500 that is being conveyed. Upon completion of coating on an exposed portion exposed through the open tail gate 530, the fixed opener robot 40a closes the tail gate 530. The fixed opener robot 40b opens and closes the hood 520 by a procedure similar to the procedure for opening and closing the open tail gate 530.

The fixed opener robots 40 are disposed above the movable opener robots 20. While in FIG. 1 the fixed opener robot 40 and the coating robot 10 are approximately at the same height, the fixed opener robot 40 and the coating robot 10 may be at different heights.

In the first embodiment illustrated in FIGS. 1 and 2, the fixed opener robot 40a is disposed to the right of the conveyor 210 in the Y axis directions, and the fixed opener robot 40b is disposed to the left of the conveyor 210 in the Y axis directions. Arranging the fixed opener robots 40 in this manner facilitates keeping a balance of strength of the coating booth 200 in the right-left directions. It will be understood that the fixed opener robot 40a may be disposed to the left of the conveyor 210, and the fixed opener robot 40b may be disposed to the right of the conveyor 210. It will also be understood that both the fixed opener robot 40a and the fixed opener robot 40b may be disposed to the right of the conveyor 210 or to the left of the conveyor 210.

In the first embodiment illustrated in FIG. 2, the movable opener robots 20 are further away from the conveyor 210 than the coating robots 10 are from the conveyor 210 in the Y axis directions. In another possible embodiment, the movable opener robots 20 may be closer to the conveyor 210 than the coating robots 10 are to the conveyor 210 in the Y axis directions. In still another possible embodiment, the movable opener robots 20 and the coating robots 10 may be at equal distances from the conveyor 210 in the Y axis directions.

Figure 3:
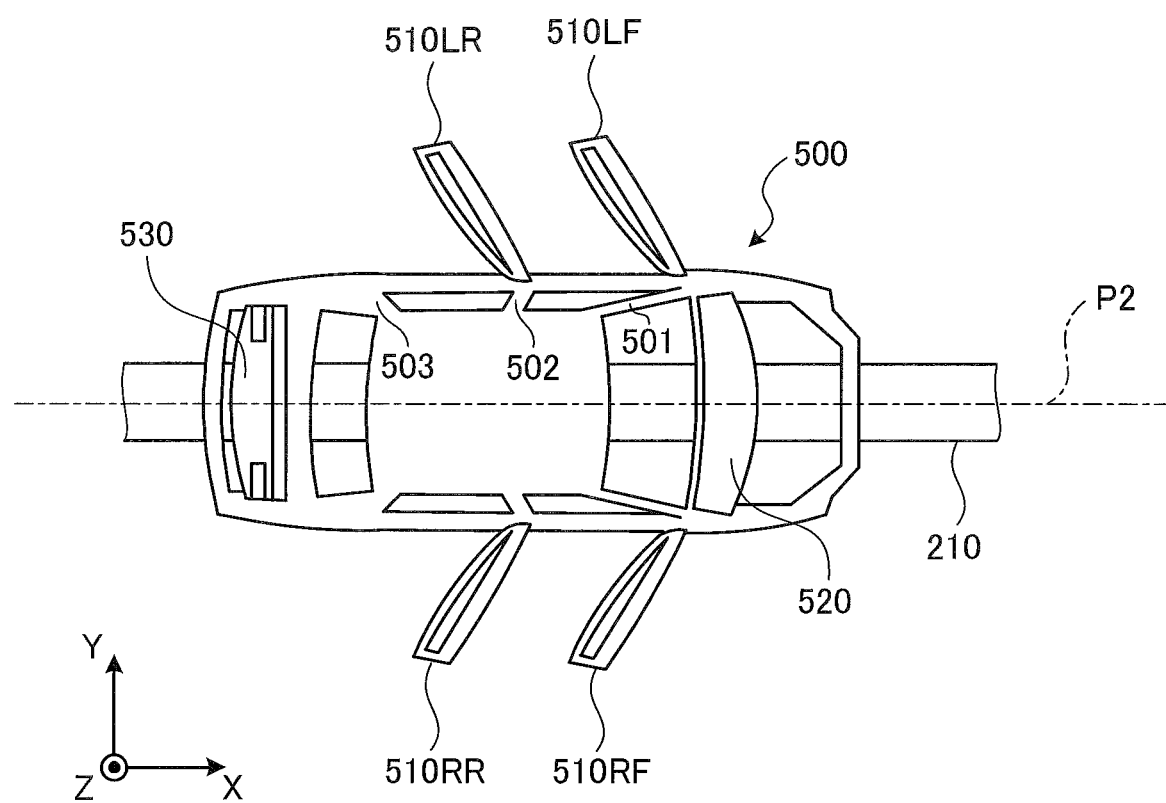
FIG. 3 is a diagram illustrating a workpiece.

Next, details of the workpiece 500 will be described by referring to FIG. 3. FIG. 3 is a diagram illustrating the workpiece 500. Specifically, FIG. 3 is a top view of the workpiece 500 with its openable members open.

As illustrated in FIG. 3, the workpiece 500 is a "four-door vehicle" without an engine and other interior parts. The workpiece 500 is conveyed on the conveyor 210 while being fixed to a movable portion of the conveyor 210. The workpiece 500 includes A pillars 501, B pillars 502, and C pillars 503, from the front toward the rear of the workpiece 500.

The B pillars 502 are located inside the workpiece 500 when the side doors are closed and, therefore, difficult to coat with the side doors closed. In view of the circumstances, the coating system 1 coats the B pillars 502 with the front doors and the rear doors open.

The openable members of the workpiece 500 include a front-right side door 510RF, a rear-right side door 510RR, a front-left side door 510LF, and a rear-left side door 510LR. The front-right side door 510RF and the rear-right side door 510RR are disposed on the right side of the workpiece 500, and the front-left side door 510LF and the rear-left side door 510LR are disposed on the left side of the workpiece 500. The doors 510 are openable in the X axis positive direction and closable in the X axis negative direction. These openable members disposed on the right and left sides of the workpiece 500 will be referred to as side openable members.

Other openable members of the workpiece 500 include a front openable member 520 and a rear openable member 530. The front openable member 520 is disposed at a front portion of the workpiece 500, and the rear openable member 530 is disposed at a rear portion of the workpiece 500. A non-limiting example of the front openable member 520 is a hood, and non-limiting examples of the rear openable member 530 are a tail gate and a rear hatch. The front openable member 520 and the rear openable member 530 are openable and closable in vertical directions.

These openable members disposed at front and rear portions of the workpiece 500 will be referred to as "front and rear openable members". In the following description, the term "rear" may occasionally be referred to as "tail".

The coating system 1 performs "inner surface coating" on the workpiece 500 illustrated in FIG. 3. Specifically, the coating system 1 coats exposed portions, which are exposed when the openable members are open. Examples of the exposed portions include, but are not limited to, the B pillars 502, side panels disposed on the sides of the workpiece 500, and the inner surfaces of the doors 510. A specific procedure for the coating will be described later by referring to FIG. 7.

Figure 4:
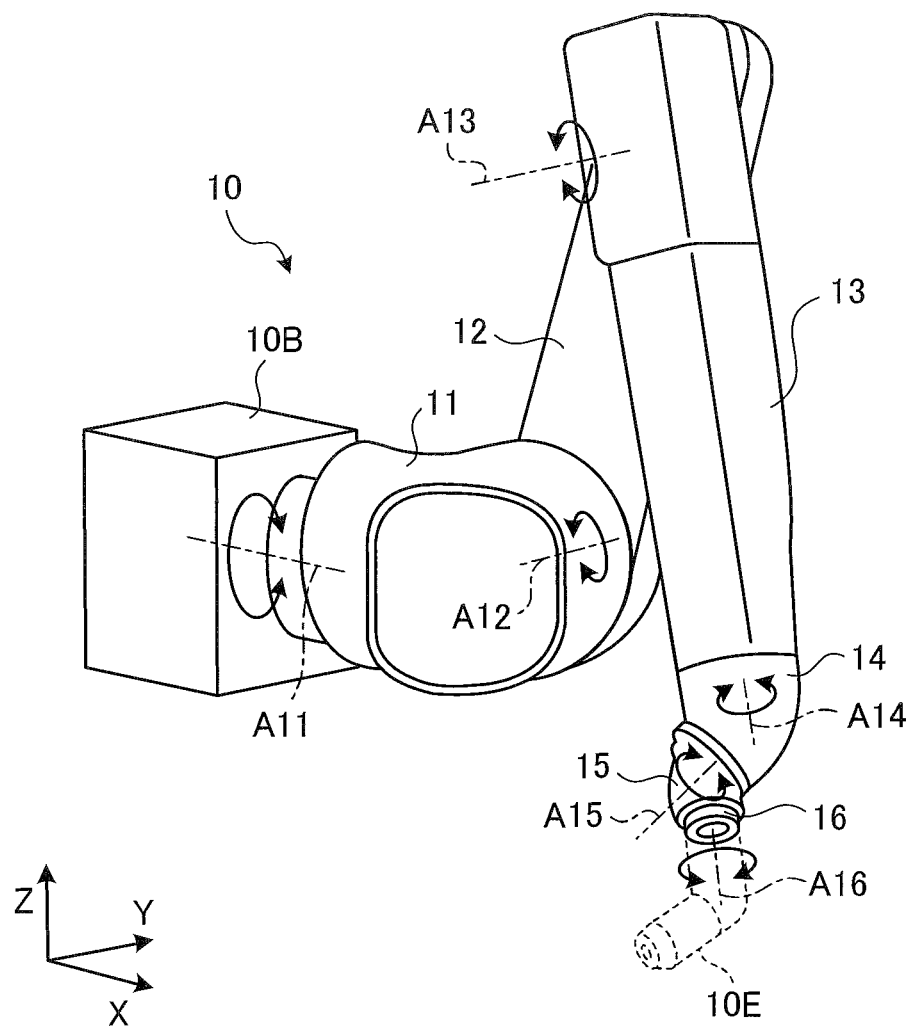
FIG. 4 is a perspective view of a coating robot.

Next, a configuration of the coating robot 10 will be described by referring to FIG. 4. FIG. 4 is a perspective view of the coating robot 10. The arm configuration of the coating robot 10 illustrated in FIG. 4 corresponds to the arm configuration of the coating robot 10R2 illustrated in FIG. 1. The coating robot 10R1 illustrated in FIG. 1 and the coating robot 10 illustrated in FIG. 4 have symmetric arm configurations symmetric to each other.

As illustrated in FIG. 4, the coating robot 10 is a six-axis robot, which has six rotation axes, namely, a first axis A11, a second axis A12, a third axis A13, a fourth axis A14, a fifth axis A15, and a sixth axis A16.

The coating robot 10 includes joints corresponding to the respective axes. The joints are driven by actuators (not illustrated), causing the arms of the coating robot 10 to make turning and/or rotation movement so as to change the postures of the arms. It should be noted that the six-axis robot illustrated in FIG. 4 is an example of the coating robot 10 and that the coating robot 10 may have other than six axes.

The coating robot 10 includes, in increasing order of distance from the base end, a base 10B, a first arm 11, a second arm 12, a third arm 13, a fourth arm 14, a fifth arm 15, and a sixth arm 16.

The base 10B is fixed to the coating booth 200 (see FIG. 1) or another member other than the coating robot 10, As illustrated in FIG. 4, the base 10B has a rectangular parallelepiped shape, with six surfaces. One of the six surfaces is where the first arm 11 is disposed, and one of the other five surfaces is fixed to the coating booth 200 or another member other than the coating robot 10 Thus, the base 10B enables the coating robot 10 to be disposed at a desired position.

The first arm 11 is, at its base end, supported by the base 10B turnably about the first axis A11, which is along the X axis illustrated in FIG. 4. As shown in FIG. 4, the first arm 11 is directly pivotally connected to the base 10B about the first axis A11. The second arm 12 is, at its base end, supported by the leading end of the first arm 11 turnably about the second axis A12, which is perpendicular to the first axis A11. The third arm 13 is, at its base end, supported by the leading end of the second arm 12 turnably about the third axis A13, which is parallel to the second axis A12.

The fourth arm 14 is, at its base end, supported by the leading end of the third arm 13 turnably about the fourth axis A14, which is perpendicular to the third axis A13. The fifth arm 15 is, at its base end, supported by the leading end of the fourth arm 14 turnably about the fifth axis A15, which crosses the fourth axis A14 at a predetermined angle. The sixth arm 16 is, at its base end, supported by the leading end of the fifth arm 15 turnably about the sixth axis A16, which crosses the fifth axis A15 at a predetermined angle.

The sixth arm 16 is the leading end arm of the coating robot 10 and capable of receiving a detachable end effector 10E (indicated by broken lines in FIG. 4) such as a coating gun. The coating robot 10 has an internal space through which cables and tubes associated with the end effector 10E are passed. The internal space ensures that the cables and tubes are connected to the end effector 10E without being exposed.

The fixed opener robots 40a and 40b illustrated in FIG. 1 each may be the robot illustrated in FIG. 4. In another possible embodiment, the fixed opener robots 40a and 40b illustrated in FIG. 1 may be robots having symmetric arm configurations symmetric to each other. In either case, the end effector may be a hooked end effector (not illustrated) to engage with the front openable member 520 and the rear openable member 530 illustrated in FIG. 3.

Figure 5:
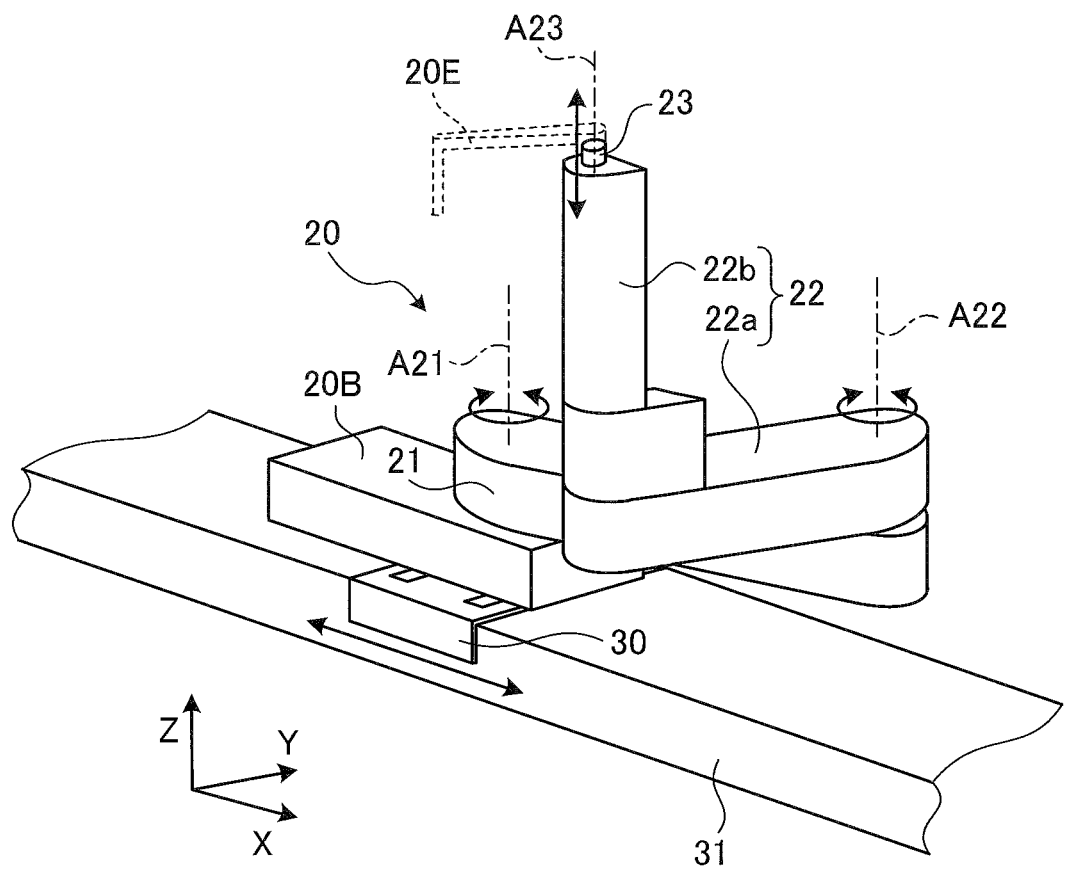
FIG. 5 is a perspective view of a movable opener robot.

Next, a configuration of the movable opener robot 20 will be described by referring to FIG. 5. FIG. 5 is a perspective view of the movable opener robot 20. As illustrated in FIG. 5, the movable opener robot 20 is supported by the travel driving mechanism 30 and movable along the guide 31, in the X axis positive direction and the X axis negative direction illustrated in FIG. 5. The orientation of the movable opener robot 20 illustrated in FIG. 5 corresponds to the orientation of the movable opener robot 20R1 illustrated in FIG. 1.

As illustrated in FIG. 5, the movable opener robot 20 is a three-axis robot having a first axis A21, a second axis A22, and a third axis A23. The first axis A21 and the second axis A22 are rotation axes, and the third axis A23 is a vertical movement axis. The movable opener robot 20 includes, in increasing order of distance from the base end, a base 20B, a first arm 21, a second arm 22, and a third arm 23.

The base 20B is fixed to the travel driving mechanism 30. The first arm 21 is, at its base end, supported by the base 20B turnably about the first axis A21, which is vertically oriented. The second arm 22 is, at its base end, supported by the leading end of the first arm 21 turnably about the second axis A22, which is parallel to the first axis A21.

The second arm 22 includes a horizontal extension 22a and a vertical extension 22b. The horizontal extension 22a extends horizontally, and the vertical extension 22b extends vertically upward from the leading end of the horizontal extension 22a. In the vertical extension 22b, an elevating mechanism is disposed to move the third arm 23 upward and downward.

The third arm 23 is supported by the second arm 22 with the leading end of the third arm 23 protruding from the upper surface of the vertical extension 22b of the second arm 22. With this configuration, the third arm 23 is movable upward and downward along the third axis A23. The third arm 23 is the leading end arm of the movable opener robot 20 and capable of receiving a detachable end effector 20E, which is capable of engaging with an openable member of the workpiece 500 (see FIG. 3).

As illustrated in FIG. 5, the end effector 20E has a link extending horizontally and having a downwardly bent leading end. The angle, in plan view, between the end effector 20E extending horizontally and the second arm 22 extending horizontally may be fixed at any desirable angle. It will be understood that the third arm 23 may be turnable about the third axis A23, and the movable opener robot 20 may be a four-axis robot.

An operation of the movable opener robot 20 will be described. When the doors 510 of the workpiece 500 (see FIG. 3) is to be opened, the movable opener robot 20 moves the third arm 23 upward and moves the leading end of the end effector 20E to a position over the space where the window glass of the doors 510 is to be fitted.

Then, the movable opener robot 20 moves the third arm 23 downward to engage with the door 510. Next, the movable opener robot 20 folds the first arm 21 and the second arm 22 to open the door 510. Then, with the movable opener robot 20 engaging with the open door 510, the movable opener robot 20 moves on the guide 31 to follow the workpiece 500 (see FIG. 3) that is being conveyed.

Next, the coating robot 10 (see FIG. 4) coats the exposed portion exposed through the open door 510. Upon completion of the coating, the movable opener robot 20 increases the angle between the first arm 21 and the second arm 22 to close the door 510. Then, the movable opener robot 20 moves the third arm 23 upward to disengage from the door 510. Next, the movable opener robot 20 moves on the guide 31 in the direction opposite to the conveyance direction of the workpiece 500 to return to a predetermined home position.

While in FIG. 5 a single movable opener robot 20 supports a single travel driving mechanism 30, a single travel driving mechanism 30 may support two movable opener robots 20. Specifically, a pair of travel driving mechanisms 30 may be respectively disposed on a pair of guides 31, and each of the pair of travel driving mechanisms 30 may support two movable opener robots 20.

Figure 6:
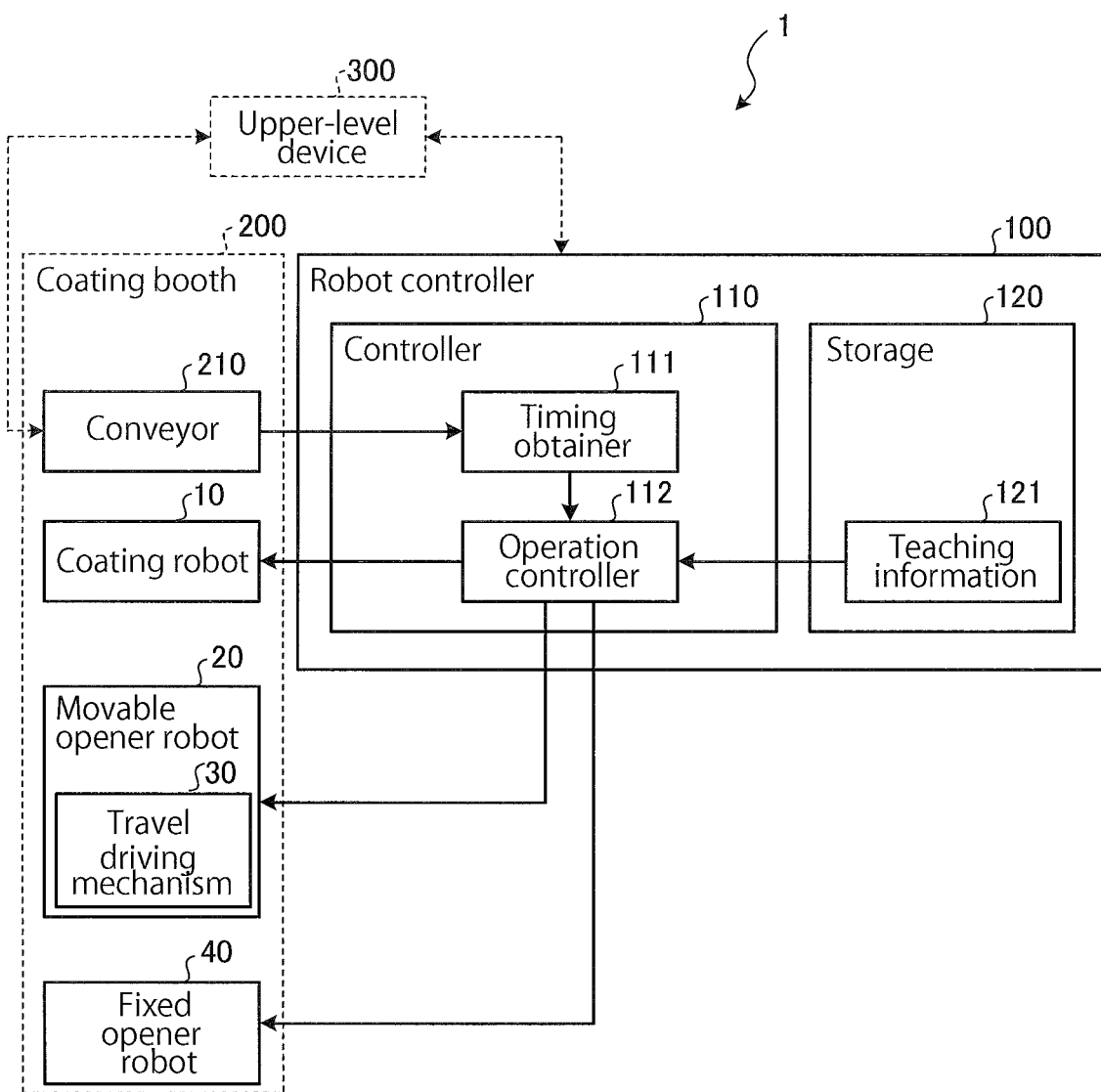
FIG. 6 is a block diagram illustrating a configuration of the coating system.

Next, a configuration of the coating system 1 according to the first embodiment will be described by referring to FIG. 6. FIG. 6 is a block diagram illustrating a configuration of the coating system 1. As illustrated in FIG. 6, the coating system 1 includes, in the coating booth 200, the conveyor 210, the coating robot 10, the movable opener robot 20, and the fixed opener robot 40.

The coating system 1 also includes a robot controller 100. The conveyor 210, the coating robot 10, the movable opener robot 20, and the fixed opener robot 40 are connected to the robot controller 100.

The coating system 1 also includes an upper-level device 300. The upper-level device 300 is in charge of overall control of operation of the conveyor 210 and the robot controller 100. The upper-level device 300 also notifies the robot controller 100, described later, of information such as vehicle type information, which shows the type of the workpiece 500 (see FIG. 3). To serve these purposes, the upper-level device 300 includes a computer and various circuits, similarly to the robot controller 100. In another possible embodiment, the upper-level device 300 may be omitted and the robot controller 100 may receive the vehicle type information from the conveyor 210 or from a terminal device connected to the robot controller 100 over a network.

As described above, the conveyor 210 conveys the workpiece 500 in a predetermined conveyance direction. The conveyor 210 includes a detecting device such as a sensor (not illustrated) to detect the position of the workpiece 500, and notifies the robot controller 100 of a timing at which the workpiece 500 has passed a predetermined point. The following description will be under the assumption that the conveyor 210 conveys the workpiece 500 at a constant speed.

The coating robot 10 coats the workpiece 500, In the first embodiment illustrated in FIGS. 1 and 2, there are four coating robots 10 disposed in the coating booth 200. The configuration of the coating robot 10 has already been described above by referring to FIG. 4 and will not be elaborated upon here.

The movable opener robot 20 operates the doors 510 (see FIG. 3), which are side openable members of the workpiece 500. In the first embodiment illustrated in FIGS. 1 and 2, there are four movable opener robots 20 disposed in the coating booth 200. FIG. 6 illustrates the travel driving mechanism 30 (see FIG. 1) as being incorporated in the movable opener robot 20. The configuration of the movable opener robot 20 has already been described above by referring to FIG. 5 and will not be elaborated upon here.

The fixed opener robot 40 operates the front openable member 520 and the rear openable member 530 (see FIG. 3), which are front and rear openable members of the workpiece 500. In the first embodiment illustrated in FIGS. 1 and 2, there are two fixed opener robots 40 disposed in the coating booth 200. The configuration of the fixed opener robot 40 is similar to the configuration of the robot illustrated in FIG. 4 and will not be elaborated upon here.

The robot controller 100 includes a controller 110 and a storage 120. The controller 110 includes a timing obtainer 111 and an operation controller 112. The storage 120 stores teaching information 121. While FIG. 6 illustrates a single robot controller 100 for simplicity of description, one robot controller may be dedicated to the coating robot 10 and another robot controller may be dedicated to the movable opener robot 20. In this case, it is possible to provide an upper-level robot controller to collectively control the robot controllers.

The robot controller 100 includes a computer and various circuits. The computer includes CPU (Central Processing Unit), ROM (Read Only Memory), RAM (Random Access Memory), HDD (Hard Disk Drive), and an input/output port.

The CPU of the computer reads programs stored in the ROM and executes the programs, and thus functions as the timing obtainer 111 and the operation controller 112 of the controller 110.

Alternatively, at least one or all of the timing obtainer 111 and the operation controller 112 may be implemented by hardware such as ASIC (Application Specific Integrated Circuit) and FPGA (Field Programmable Gate Array).

The storage 120 corresponds to the RAM and/or the HDD. The RAM and the HDD are capable of storing the teaching information 121. In another possible embodiment, the robot controller 100 may obtain the above-described programs and the various kinds of information from another computer connected to the robot controller 100 through a wired or wireless network or from a portable recording medium. In still another possible embodiment, the robot controller 100 may be provided in plural, as described above, and the plurality of robot controllers 100 may be capable of communicating with each other or may be provided in a hierarchical manner so that one robot controller 100 is capable of communicating with an upper-level robot controller 100 or a lower-level robot controller 100.

The controller 110 controls the robots while obtaining position information (pulse signals) and interlock signals from the conveyor 210. The pulse signals indicate positions of jigs such as a platform with which the workpiece 500 (see FIG. 3) is fixed to the movable portion of the conveyor 210. The interlock signals are used for independent operations of the devices. Additionally, in the case where there are a plurality of robot controllers 100, the controller 110 synchronizes the robot controllers 100.

As described above, the timing obtainer 111 obtains the position information and the interlock signals from the conveyor 210. Then, based on the obtained position information and interlock signals, the timing obtainer 111 determines the timing at which to operate each robot, and notifies the operation controller 112 of the determined operation timing. For example, the timing obtainer 111 obtains the timing at which the workpiece 500 (see FIG. 3) reaches a predetermined position in the coating booth 200. Then, the timing obtainer 111 instructs the operation controller 112 to operate the robots based on the obtained timing.

In response to the instruction from the timing obtainer 111, the operation controller 112 operates the robots based on the teaching information 121. The operation controller 112 performs feedback control using encoder values from the actuators of the robots (not illustrated) so as to improve the accuracy with which the robots are operated. In the case where the operation controller 112 has received from the upper-level device 300 the vehicle type information, which shows the type of the workpiece 500 (see FIG. 3), the operation controller 112 operates the robots based on the type of the workpiece 500.

The teaching information 121 is generated at the teaching stage of teaching the robots how to operate, and includes "jobs", which are programs specifying movement paths of the robots. As described above, the coating system 1 includes robots having symmetric arm configurations symmetric to each other and includes robots symmetric to each other with respect to the conveyor 210 (see FIG. 2). This configuration ensures that the teaching data for the robots can be shared between the robots by reversing the teaching data. Thus, with such teaching data included in the teaching information 121, the coating system 1 ensures minimized labor and cost associated with generation of the teaching information 121.

Figure 7:
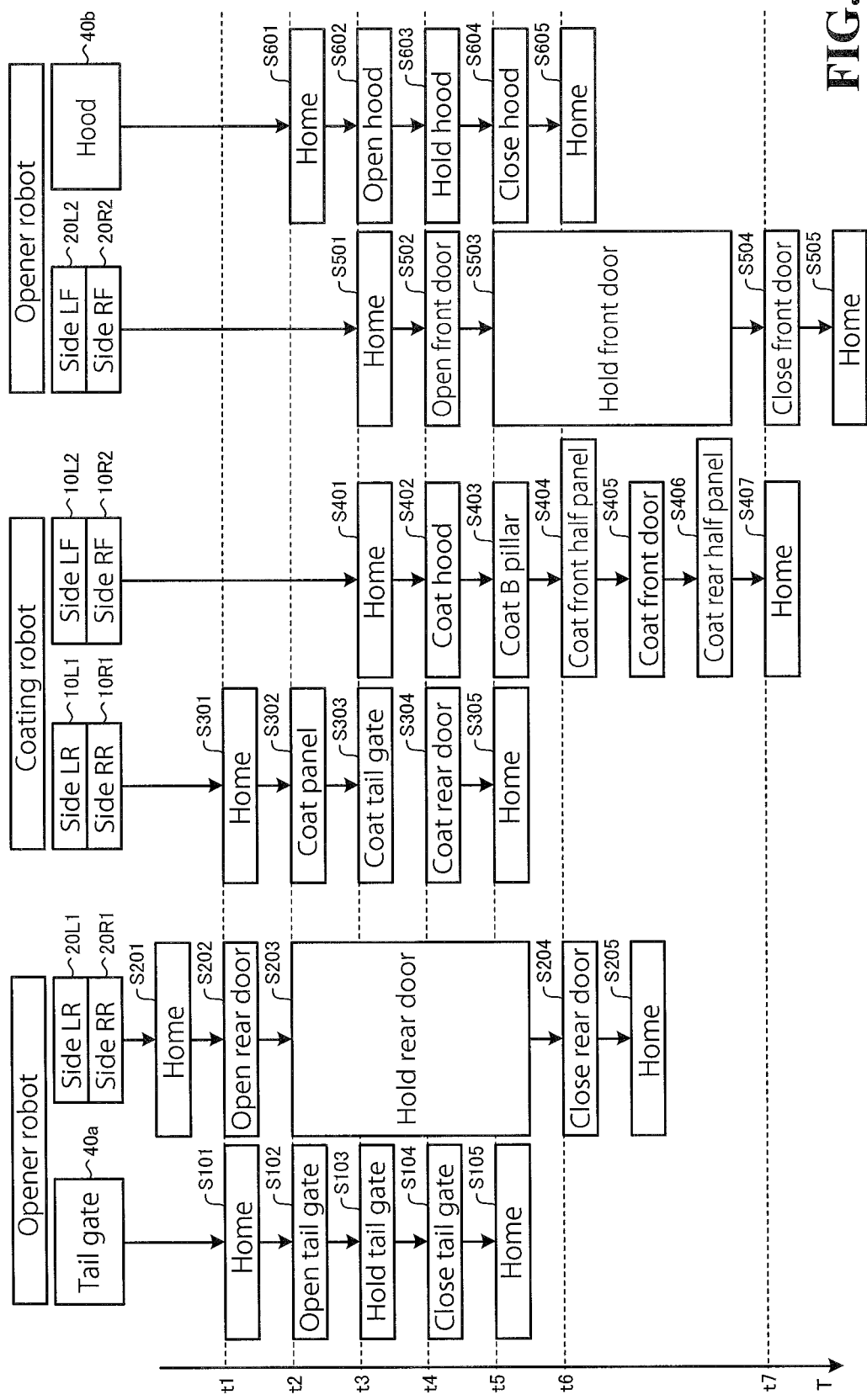
FIG. 7 is a sequence diagram of how the coating system operates.

Next, a procedure for operation of the coating system 1 will be described by referring to FIG. 7. FIG. 7 is a sequence diagram of how the coating system 1 operates, Referring to FIG. 7, "Home" is an abbreviation of "Home position", indicating a wait posture and a wait position of a robot. Also referring to FIG. 7, the vertical axis indicates time (T), so that time passes in the vertical axis direction.

The following description refers to the robots illustrated in FIG. 2 and the workpiece 500 illustrated in FIG. 3. First, a procedure for coating the rear half of the workpiece 500 will be described, including opening and closing the tail gate 530 and the rear doors 510RR and 510LR (see FIG. 3) of the workpiece 500. Next, a procedure for coating the front half of the workpiece 500 will be described, including opening and closing the hood 520 and the front doors 510RF and 510LF (see FIG. 3) of the workpiece 500.

First, a procedure for coating the rear half of the workpiece 500 will be described. As illustrated in FIG. 7, the movable opener robots 20R1 and 20L1 wait at home position (step S201). Then, at timing t1, the movable opener robots 20R1 and 20L1 open the rear doors of the workpiece 500 (step S202). At timing t1, the fixed opener robot 40a waits at home position (step S101), and the coating robots 10R1 and 10L1 also wait at home position (step S301).

At timing t2, the fixed opener robot 40a opens the tail gate of the workpiece 500 (step S102) and holds the open tail gate while changing the postures of the arms to follow the workpiece 500 that is being conveyed (step S103). At timing t2, the movable opener robots 20R1 and 20L1, while holding the open rear doors, move in the conveyance direction of the workpiece 500 to follow the workpiece 500 that is being conveyed (step S203).

At timing t2, the coating robots 10R1 and 10L1 coat the side panels exposed through the open rear doors (step S302). Next, the coating robots 10R1 and 10L1 coat interior portion exposed through the open tail gate (step S303). Next, the coating robots 10R1 and 10L1 coat interiors portions exposed through the open rear doors (step S304). Upon completion of the coating at step S304, the coating robots 10R1 and 10L1 return to home position (step S305).

At timing t4, the coating robots 10R1 and 10L1 have finished coating the tail gates. At or after timing t4, the fixed opener robot 40a closes the tail gate of the workpiece 500 (step S104). Upon completion of the processing at step S104, the fixed opener robot 40a returns to home position (step S105).

At timing t6, the coating robots 10R1 and 10L1 have finished coating the interiors of the rear doors of the workpiece 500. At or after timing t6, the movable opener robots 20R1 and 20L1 close the rear doors (step S204). Upon completion of the processing at step S204, the movable opener robots 20R1 and 20L1 move in the direction opposite to the conveyance direction of the workpiece 500 and return to home position (step S205).

As described above, the rear doors of the workpiece 500 are opened at timing t1 and closed at timing t6. The tail gate of the workpiece 500 is opened at timing t2, which is later than timing t1, and closed at timing t4, which is earlier than timing t6. Thus, the period of time for which the tail gate is open overlaps the period of time for which the rear doors are open.

Thus, the period of time for which the front and rear openable members are open overlaps the period of time for which the side openable members are open. This configuration shortens the time for the coating processing. While in FIG. 7 the tail gate of the workpiece 500 is closed earlier than the rear doors, the tail gate may be closed later than the rear doors.

Next, a procedure for coating the front half of the workpiece 500 will be described. As illustrated in FIG. 7, the fixed opener robot 40b waits at home position (step S601). At timing t3, the fixed opener robot 40b opens the hood of the workpiece 500 (step S602) and holds the open hood while changing the postures of the arms to follow the workpiece 500 that is being conveyed (step S603).

At timing t3, the movable opener robots 20R2 and 20L2 wait at home position (step S501), and the coating robots 10R2 and 10L2 also wait at home position (step S401).

At timing t4, the movable opener robots 20R2 and 20L2 open the front doors of the workpiece 500 (step S502), Then, while holding the open front doors, the movable opener robots 20R2 and 20L2 move in the conveyance direction of the workpiece 500 to follow the workpiece 500 that is being conveyed (step S503). In FIG. 7, the timing at which the movable opener robots 20R2 and 20L2 open the front doors of the workpiece 500 is timing t4, and the timing at which the fixed opener robot 40a closes the tail gate of the workpiece 500 is timing t4, too. These timings, however, may not necessarily match each other.

Then, the coating robots 10R2 and 10L2 coats interior portion exposed through the open hood (step S402). Next, the coating robots 10R2 and 10L2 coat the B pillars 502 (see FIG. 3) exposed through the open rear and front doors (step S403). Next, the coating robots 10R2 and 10L2 coats front side panels exposed through the open front doors (step S404).

Next, the coating robots 10R2 and 10L2 coat interiors portions exposed through the open front doors (step S405). Then, the coating robots 10R2 and 10L2 coat rear side panels (step S406). Upon completion of the processing at step S406, the coating robots 10R2 and 10L2 return to home position (step S407).

At timing t5, the coating robots 10R2 and 10L2 have finished coating the hood of the workpiece 500. At or after timing t5, the fixed opener robot 40b closes the hood of the workpiece 500 (step S604). Upon completion of the processing at step S604, the fixed opener robot 40b returns to home position (step S605).

At timing t7, the coating robots 10R2 and 10L2 have finished coating the rear side panels of the workpiece 500. At or after timing t7, the movable opener robots 20R2 and 20L2 close the front doors of the workpiece 500 (step S504). Upon completion of the processing at step S504, the movable opener robots 20R2 and 20L2 move in the direction opposite to the conveyance direction of the workpiece 500 and return to home position (step S505).

As described above, the rear doors of the workpiece 500 are opened at timing t1 and closed at timing 16. The front doors of the workpiece 500 are opened at timing t4, which is later than timing t1, and closed at timing t7, which is later than timing t6. Thus, the period of time for which the front doors are open overlaps the period of time for which the rear doors are open.

Thus, the period of time for which the front doors are open overlaps the period of time for which the rear doors are open. This configuration facilitates coating on portions that can be coated more effectively with the front and rear doors open (for example, the B pillars 502 illustrated in FIG. 3). Additionally, making the periods overlap each other shortens the time for the coating processing.

As described above, the front doors of the workpiece 500 are opened at timing t4 and closed at timing t7. The hood of the workpiece 500 is opened at timing t3, which is earlier than timing t4, and closed at timing t5, which is earlier than timing t7. Thus, the period of time for which the hood is open overlaps the period of time for which the front doors are open.

Thus, the period of time for which the front and rear openable members are open overlaps the period of time for which the side openable members are open. This configuration shortens the time for the coating processing. While in FIG. 7 the hood of the workpiece 500 is closed earlier than the front doors, the hood may be closed later than the front doors.

As has been described hereinbefore, the coating system according to the first embodiment includes coating robots and movable opener robots. The coating robots are fixed in the coating booth and coat a vehicle that is being conveyed in a predetermined conveyance direction. The movable opener robots are disposed below the coating robots in the coating booth and movable in the conveyance direction to operate openable members of the vehicle.

With this configuration, the coating system according to the first embodiment minimizes the initial cost, the operating cost, and other costs while eliminating or minimizing interference between the coating robot and the movable opener robot.

In the coating system according to the first embodiment, two movable opener robots are disposed to the right of the conveyor, and another two movable opener robots are disposed to the left of the conveyor. In another possible embodiment, one movable opener robot may be disposed to the right of the conveyor, and another one movable opener robot may be disposed to the left of the conveyor. In this case, in coating a four-door vehicle, the movable opener robots first close the rear doors of the four-door vehicle and then open the front doors. In coating a two-door vehicle, one movable opener robot is sufficient on one side of the two-door vehicle, and, likewise, one movable opener robot is sufficient on the other side of the two-door vehicle.

The first embodiment is open to variations of the number of robots and the arrangement of the robots. Examples of the variations will be described below as a second embodiment and a third embodiment.

Second Embodiment

Figure 8:
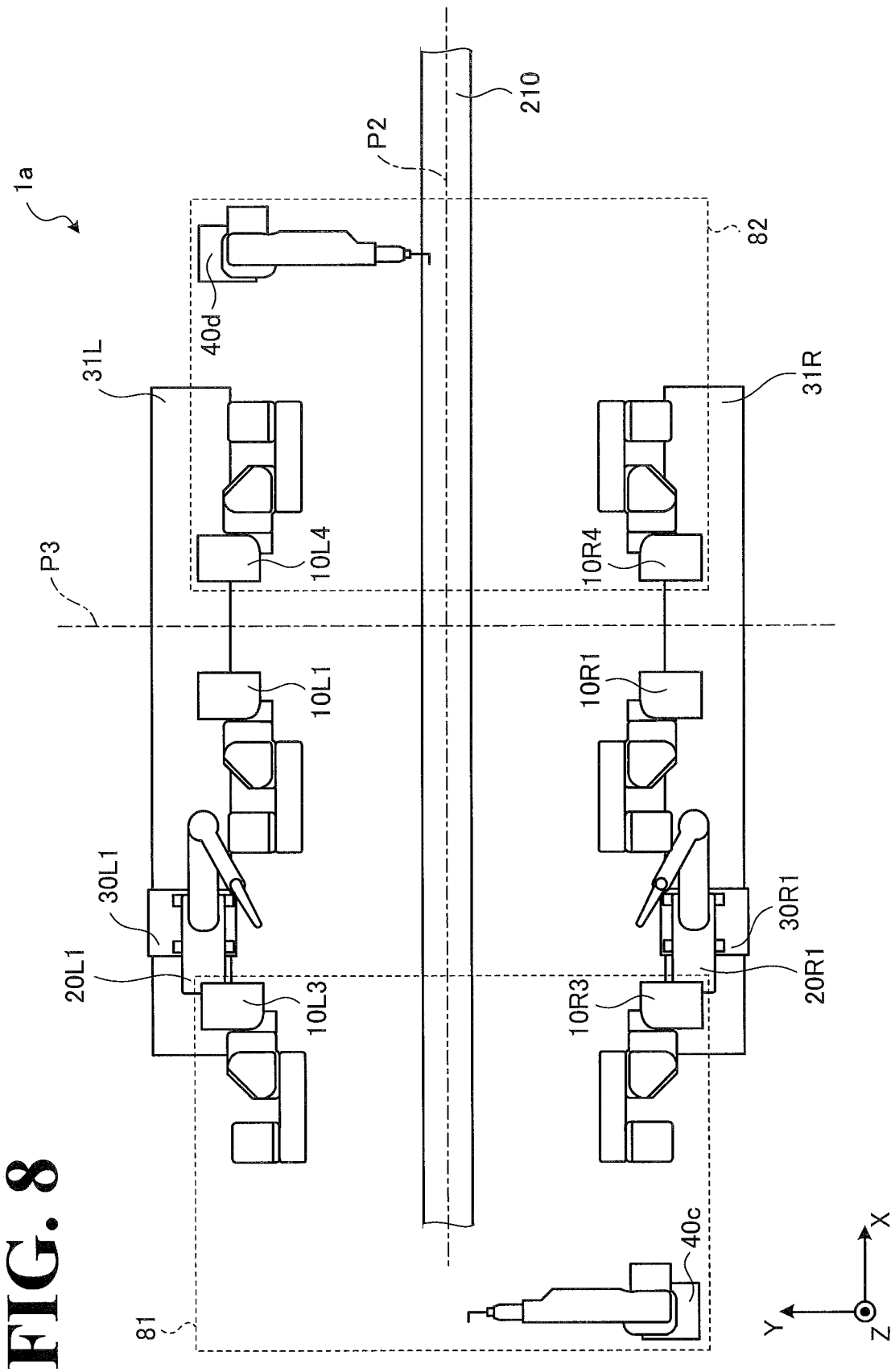
FIG. 8 is a top view of a coating system according to a second embodiment.

A coating system 1a according to the second embodiment will be described by referring to FIG. 8. FIG. 8 is a top view of the coating system 1a according to the second embodiment. The coating system 1a is different from the coating system 1 according to the first embodiment in the number of robots and the arrangement of the robots. The following description focuses on differences between the coating system 1 and the coating system 1a, omitting or minimizing description of identical or substantially identical components, which are denoted with identical or substantially identical reference numerals, between the coating system 1 and the coating system 1a.

As illustrated in FIG. 8, the coating system 1a includes six coating robots 10, two movable opener robots 20, and two fixed opener robots 40. Among the six coating robots 10, two coating robots 10R1 and 10L1 coat the side surfaces of the workpiece 500 (see FIG. 3). In the second embodiment, two movable opener robots 20 are provided, as opposed to four movable opener robots 20 in the first embodiment.

Thus, the coating system 1a according to the second embodiment coats the side openable members (doors) 510 of the workpiece 500 using the coating robots 10R1 and 10L1 and the movable opener robots 20R1 and 20L1. The coating robots 10R1 and 10L1 have symmetric arm configurations symmetric to each other with respect to the symmetry surface P2. Likewise, the movable opener robots 20R1 and 20L1 have symmetric arm configurations symmetric to each other with respect to the symmetry surface P2. The arrangement of these robots is similar to the arrangement of the equivalent robots in the coating system 1 according to the first embodiment.

The movable opener robots 20R1 and 20L1 open and close the front doors and the rear doors of the workpiece 500. In this respect, the movable opener robots 20R1 and 20L1 are different from the equivalent robots in the first embodiment. Specifically, the movable opener robots 20R1 and 20L1 open the rear doors of the workpiece 500 and move in the conveyance direction of the workpiece 500 while holding the open rear doors to follow the workpiece 500 that is being conveyed. Then, the coating robots 10R1 and 10L1 coat exposed portions of the workpiece 500 exposed through the open rear doors. Upon completion of the coating, the movable opener robots 20R1 and 20L1 close the rear doors.

Next, while moving in the conveyance direction to follow the workpiece 500 that is being conveyed, the movable opener robots 20R1 and 20L1 open the front doors of the workpiece 500. Then, the movable opener robots 20R1 and 20L1 move further in the conveyance direction while holding the open front doors to follow the workpiece 500 that is being conveyed. Then, upon completion of coating by the coating robots 10R1 and 10L1, the movable opener robots 20R1 and 20L1 close the front doors.

The coating system 1a also coats the front and rear openable members of the workpiece 500 using groups 81 and 82. Each of the groups 81 and 82 includes three robots, namely, two coating robots 10 and one fixed opener robot 40.

The robots of the group 81 coat the rear openable member (tail gate) 530 of the workpiece 500. The group 81 includes coating robots 10R3 and 10L3, which have symmetric arm configurations symmetric to each other with respect to the symmetry surface P2. The coating robots 10R3 and 10L3 are disposed at the same height as the height of the coating robots 10R1 and 10L1 illustrated in FIG. 1.

The group 81 also includes the fixed opener robot 40c. The fixed opener robot 40c is disposed to the right of the conveyor 210 with the first axis of the fixed opener robot 40c extending upward. The fixed opener robot 40c is installed at a height between the height of the movable opener robots 20R1 and 20L1 and the height of the coating robots 10R1 and 10L1.

The fixed opener robot 40c is supported by a platform (not illustrated) disposed on the floor of the coating booth 200 (see FIG. 1). The procedure for coating the rear openable member (tail gate) 530 is similar to the procedure in the first embodiment and the will not be elaborated upon here.

The robots of the group 82 coat the front openable member (hood) 520 of the workpiece 500. The group 82 includes coating robots 10R4 and 10L4, which have symmetric arm configurations symmetric to each other with respect to the symmetry surface P2. The coating robots 10R4 and 10L4 are disposed at the same height as the height of the coating robot 10R2 illustrated in FIG. 1.

The group 82 also includes the fixed opener robot 40d. The fixed opener robot 40d is disposed to the right of the conveyor 210 with the first axis of the fixed opener robot 40d extending upward. The fixed opener robot 40d is installed at a height between the height of the movable opener robots 20R1 and 20L1 and the height of the coating robots 10R4 and 10L4.

The fixed opener robot 40d is supported by a platform (not illustrated) disposed on the floor of the coating booth 200 (see FIG. 1). The procedure for coating the front openable member (hood) 520 is similar to the procedure in the first embodiment and the will not be elaborated upon here.

As illustrated in FIG. 8, the coating robot 10R1 and the coating robot 10R4 have symmetric arm configurations symmetric to each other with respect to a symmetry surface P3, and the coating robot 10L1 and the coating robot 10L4 have symmetric arm configurations symmetric to each other with respect to the symmetry surface P3. This configuration ensures that teaching data can be shared between the robots by reversing the teaching data. This minimizes the cost of creating teaching data, resulting in minimized production cost of the robots.

Thus, in the coating system 1a, coating on the side openable members (doors) 510, coating on the front openable member (hood) 520, and coating on the rear openable member (tail gate) 530 are assigned to different robots. With this configuration, the coating system 1a simplifies the teaching information 121 (see FIG. 6) and increases the reliability with which the openable members are coated.

Also with the above configuration, either the group 81 or the group 82, depending on the type of the workpiece 500, may be stopped from working. This ensures coating on a wider variety of workpieces 500. For example, when coating on the rear openable member (tail gate) 530 is unnecessary, the group 81 may be stopped from working, while when coating on the front openable member (hood) 520 is unnecessary, the group 82 may be stopped from working.

In FIG. 8, the fixed opener robot 40c is disposed to the right of the conveyor 210, and the fixed opener robot 40d is disposed to the left of the conveyor 210. In another possible embodiment, the fixed opener robot 40c may be disposed to the left of the conveyor 210, and the fixed opener robot 40d may be disposed to the right of the conveyor 210.

Figure 9:
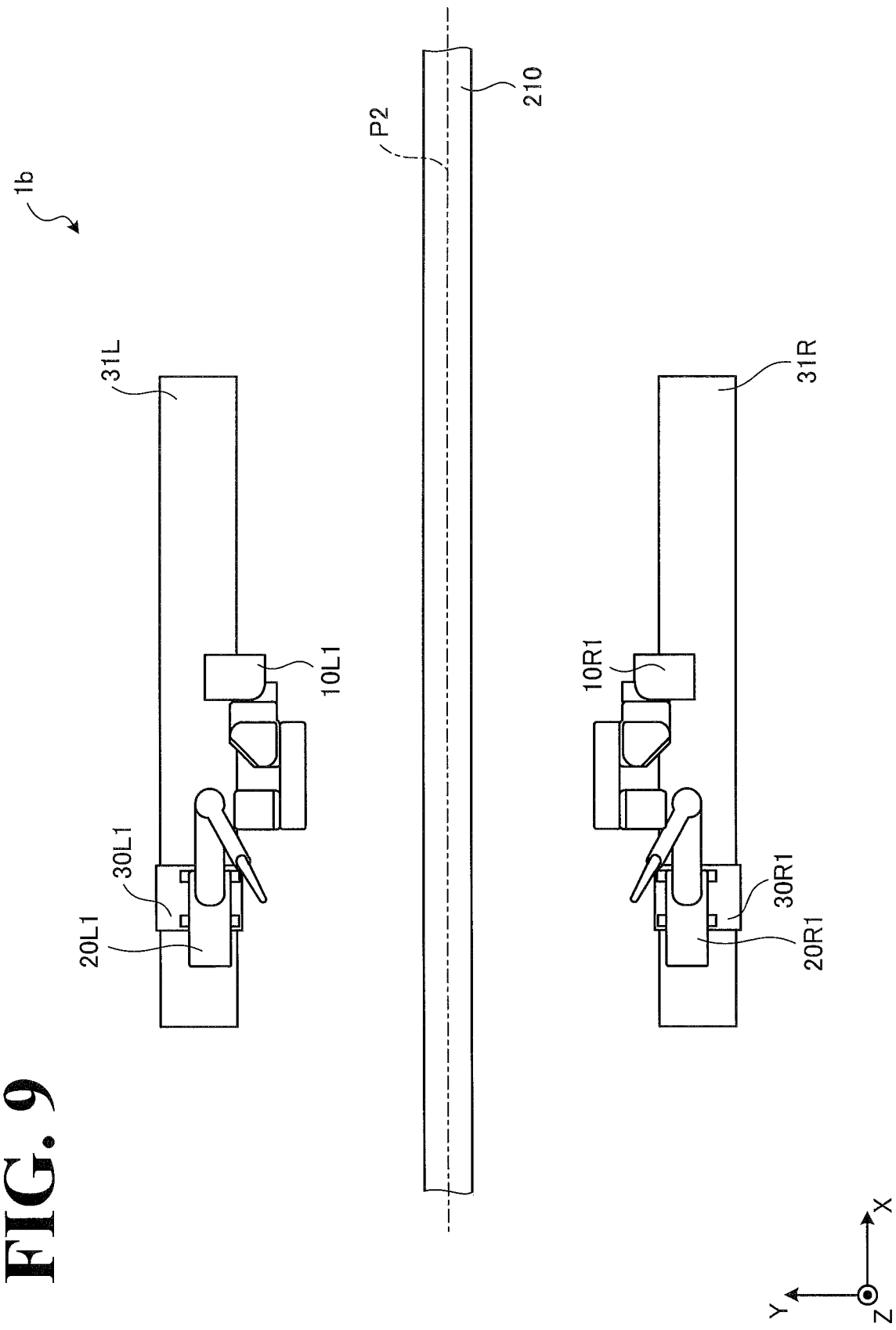
FIG. 9 is a top view of a coating system according to a modification of the second embodiment.

Next, a modification of the coating system 1a according to the second embodiment will be described by referring to FIG. 9. FIG. 9 is a top view of a coating system 1b according to a modification of the second embodiment. As illustrated in FIG. 9, the coating system 1b includes two coating robots 10 and two movable opener robots 20.

In other words, the coating system 1b is equivalent to the coating system 1a illustrated in FIG. 8 less the groups 81 and 82. For example, the coating system 1b illustrated in FIG. 9 can be used in an application where the side openable members (doors) 510 of the workpiece 500 alone are to be coated.

Third Embodiment

Figure 10:
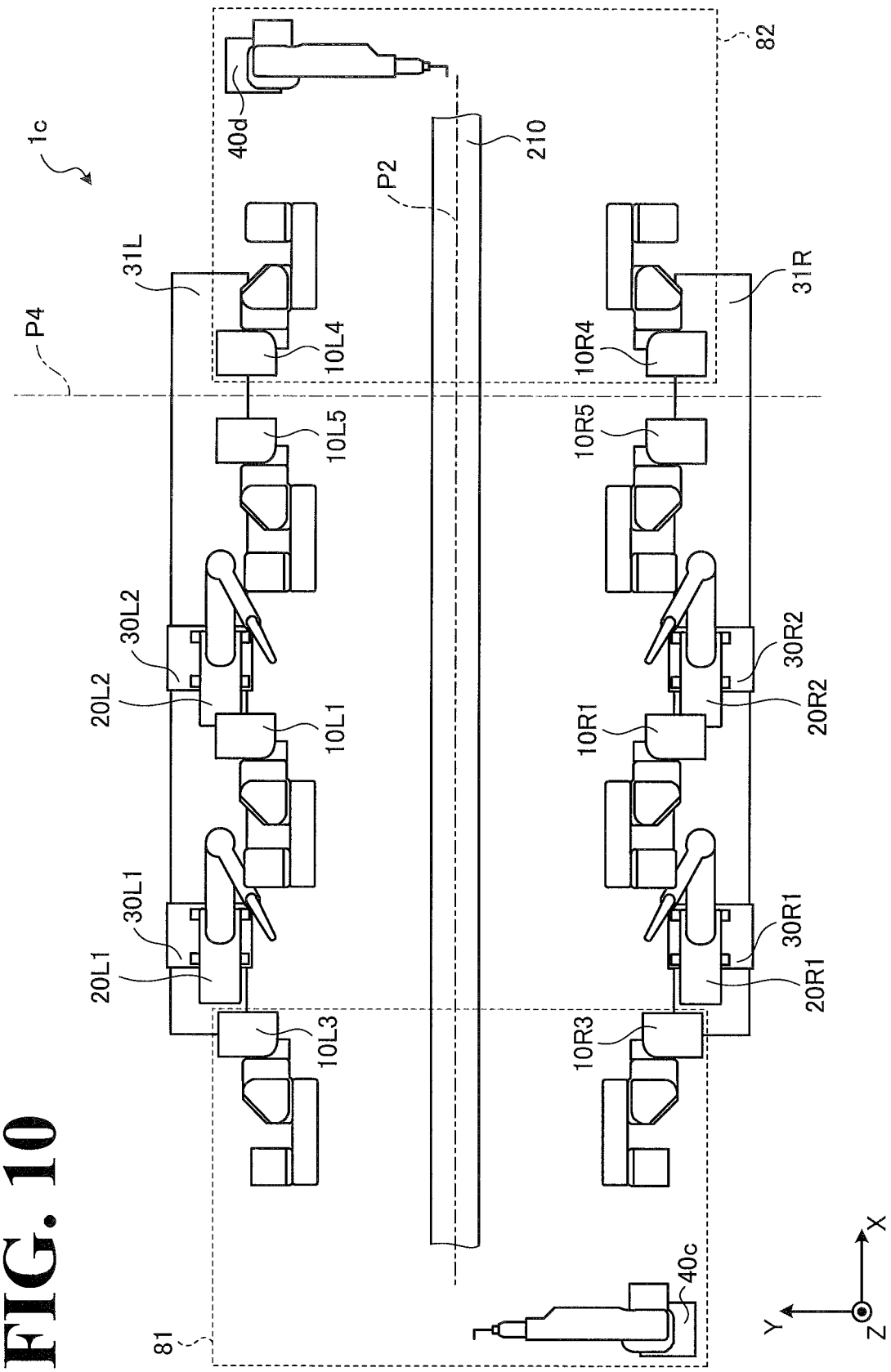
FIG. 10 is a top view of a coating system according to a third embodiment.

Next, a coating system 1c according to the third embodiment will be described by referring to FIG. 10. FIG. 10 is a top view of the coating system 1c according to the third embodiment. The coating system 1c is different from the coating system 1a according to the second embodiment in the number of robots and the arrangement of the robots. The following description focuses on differences between the coating system 1a and the coating system 1c, omitting or minimizing description of identical or substantially identical components, which are denoted with identical or substantially identical reference numerals, between the coating system 1a and the coating system 1c.

As illustrated in FIG. 10, the coating system 1c includes eight coating robots 10, four movable opener robots 20, and two fixed opener robots 40. The coating system 1c is equivalent to the coating system 1a according to the second embodiment plus coating robots 10R5 and 10L5 and the movable opener robots 20R2 and 20L2. The coating robots 10R5 and 10L5 have symmetric arm configurations symmetric to each other with respect to the symmetry surface P2. Likewise, the movable opener robots 20R2 and 20L2 have symmetric arm configurations symmetric to each other with respect to the symmetry surface P2. The groups 81 and 82 are similar to the groups 81 and 82 of the coating system 1a and will not be elaborated upon here.

Description will be made with regard to the coating robots 10R1, 10L1, 10R5, and 10L5 and the movable opener robots 20R1, 20L1, 20R2, and 20L2. The first arms of the coating robots 10R5 and 10L5 extend in the direction opposite to the extending direction of the first arms of the coating robots 10R2 and 10L2 of the coating system 1 according to the first embodiment.

That is, all the first arms of the coating robots 10R1, 10L1, 10R5, and 10L5 extend in the direction opposite to the conveyance direction of the workpiece 500. Arranging the coating robots 10 in this manner ensures reliability with which the workpiece 500 (see FIG. 3) is coated.

As illustrated in FIG. 10, the coating robot 10R5 and the coating robot 10R4 have symmetric arm configurations symmetric to each other with respect to a symmetry surface P4, and the coating robot 10L5 and the coating robot 10L4 have symmetric arm configurations symmetric to each other with respect to the symmetry surface P4. This configuration ensures that teaching data can be shared between the robots by reversing the teaching data. This minimizes the cost of creating teaching data, resulting in minimized production cost of the robots.

In FIG. 10, the fixed opener robot 40c is disposed to the right of the conveyor 210, and the fixed opener robot 40d is disposed to the left of the conveyor 210. In another possible embodiment, the fixed opener robot 40c may be disposed to the left of the conveyor 210, and the fixed opener robot 40d may be disposed to the right of the conveyor 210.

Figure 11:
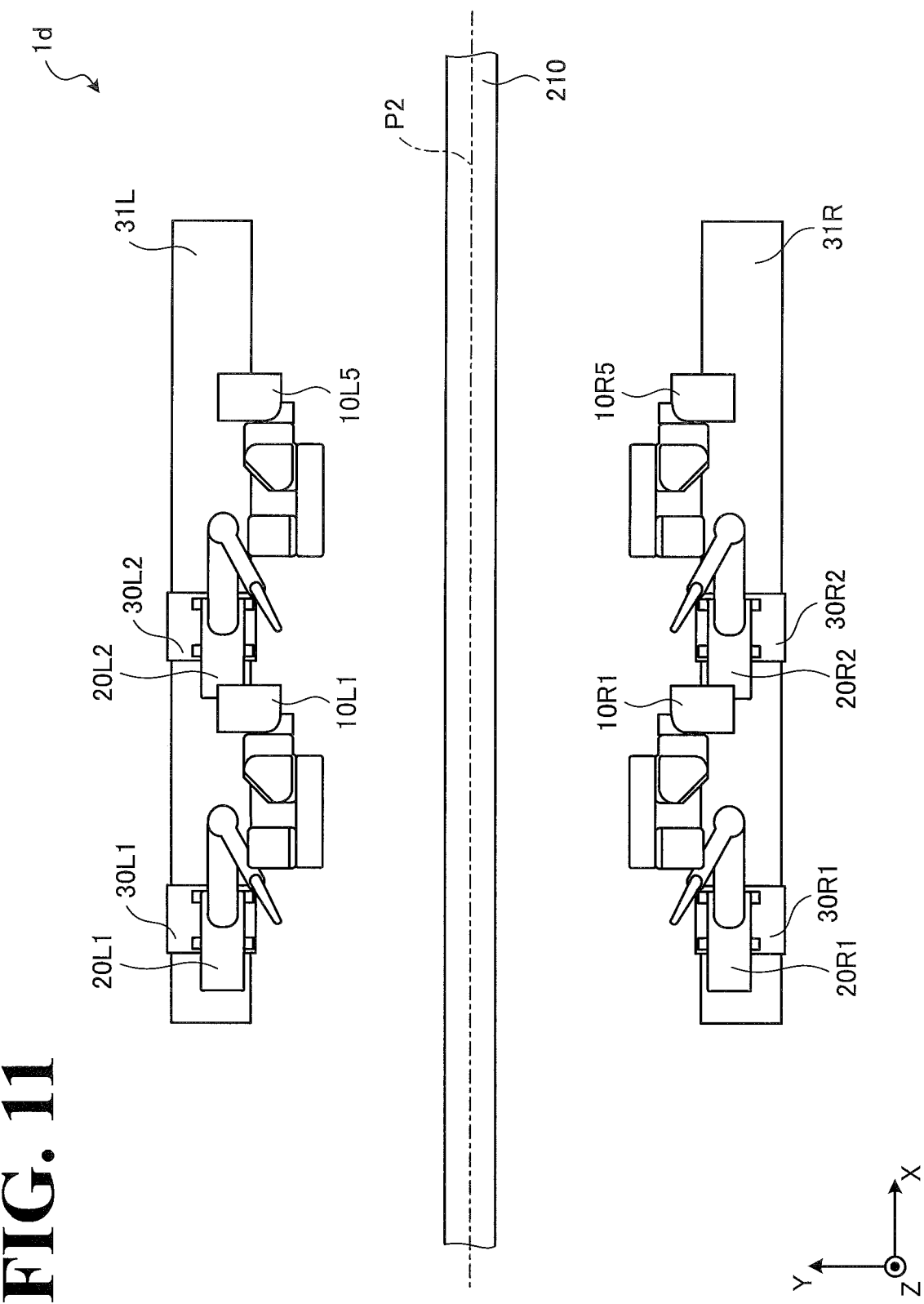
FIG. 11 is a top view of a coating system according to a modification of the third embodiment.

Next, a modification of the coating system 1c according to the third embodiment will be described by referring to FIG. 11. FIG. 11 is a top view of a coating system 1d according to a modification of the third embodiment. As illustrated in FIG. 11, the coating system 1d includes four coating robots 10 and four movable opener robots 20.

Specifically, the coating system 1d is equivalent to the coating system 1c illustrated in FIG. 10 less the groups 81 and 82. For example, the coating system 1d illustrated in FIG. 11 can be used in an application where the side openable members (doors) 510 of the workpiece 500 alone are to be coated.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A coating system comprising:
a first pair of coating robots mounted in a coating booth to coat a workpiece while the workpiece is conveyed in the coating booth in a conveyance direction substantially perpendicular to a height direction, the workpiece including a body and a first movable part movable with respect to the body;
a second pair of coating robots; and
a first operation robot disposed in the coating booth below the first pair of coating robots in the height direction, the first operation robot being movable in the coating booth in the conveyance direction and being configured to move the first movable part of the workpiece,
wherein each coating robot of the first pair of coating robots and the second pair of coating robots comprises:
a base fixed to the coating booth;
a first axis disposed on a common line parallel to the conveyance direction such that the first axis of each coating robot of the first pair of coating robots is disposed on the common line; and
a first arm turnable about the first axis, the first arm being directly pivotally connected to the base about the first axis disposed on the common line,
wherein each coating robot of the first pair of coating robots are fixed to the coating booth horizontally adjacent to one another, a first coating robot of the first pair of coating robots having axes of rotation that are symmetrical to axes of rotation of a second coating robot of the first pair of coating robots with respect to a first plane orthogonal to the conveyance direction and extending between the first coating robot of the first pair of coating robots and the second coating robot of the first pair of coating robots, the first arm extending from the base of the first coating robot of the first pair of coating robots in a direction opposite from the first arm extending from the base of the second coating robot of the first pair of coating robots in order to increase a density of the first pair of coating robots within the coating booth, the first pair of coating robots having identical distances between adjacent axes of rotation of the first coating robot of the first pair of coating robots as compared to distances between adjacent axes of rotation of the second coating robot of the first pair of coating robots,
wherein each coating robot of the second pair of coating robots are fixed to the coating booth horizontally adjacent to one another, a first coating robot of the second pair of coating robots having axes of rotation that are symmetrical axes of rotation of a second coating robot of the second pair of coating robots with respect to the first plane orthogonal to the conveyance direction and extending between the first coating robot of the second pair of coating robots and the second coating robot of the second pair of coating robots, the first arm extending from the base of the second coating robot of the second pair of coating robots in a direction opposite from the first arm extending from the base of the second coating robot of the second pair of coating robots in order to increase a density of the second pair of coating robots within the coating booth, the second pair of coating robots having identical distances between adjacent axes of rotation of the first coating robot of the second pair of coating robots as compared to distances between adjacent axes of rotation of the second coating robot of the second pair of coating robots, wherein the first coating robot of the first pair of coating robots and the second coating robot of the first pair of coating robots being disposed to a first side of a conveyor configured to convey the workpiece in the conveyance direction, the first coating robot of the first pair of coating robots and the second coating robot of the first pair of coating robots being fixed directly opposite to each other in the conveyance direction on the first side of the conveyor with the first plane being located directly intermediate the first coating robot of the first pair of coating robots and the second coating robot of the first pair of coating robots in the conveyance direction on the first side of the conveyor, wherein the first coating robot of the second pair of coating robots and the second coating robot of the second pair of coating robots being disposed to a second side of the conveyor opposite to the first side of the conveyor, the first coating robot of the second pair of coating robots and the second coating robot of the second pair of coating robots being fixed directly opposite to each other in the conveyance direction on the second side of the conveyor with the first plane being located directly intermediate the first coating robot of the second pair of coating robots and the second coating robot of the second pair of coating robots in the conveyance direction on the second side of the conveyor, and wherein the first pair of coating robots having axes of rotation that are symmetrical to axes of rotation of the second pair of coating robots with respect to a second plane extending vertically through the conveyor and orthogonal to the first plane, the second plane extending between the first pair of coating robots and the second pair of coating robots.

2. The coating system according to claim 1, further comprising:
a pair of guides symmetric to each other with respect to the conveyor configured to convey the workpiece in the conveyance direction;
travel driving mechanisms movable along the pair of guides;
a first pair of movable opener robots including the first operation robot and an additional first operation robot, the first pair of movable opener robots being supported by the travel driving mechanisms on one guide of the pair of guides;
a second pair of movable opener robots including a second operation robot and an additional second operation robot, the second pair of movable opener robots being supported by the travel driving mechanisms on another guide of the pair of guides; and
a plurality of side openable members including the first movable part and a second movable part of the workpiece, the plurality of side openable members being disposed on side surfaces of the workpiece, and the first pair of movable opener robots and the second pair of movable opener robots are configured to operate different side openable members of the plurality of side openable members.

3. The coating system according to claim 2, wherein the travel driving mechanisms comprise
a first pair of the travel driving mechanisms disposed on the one guide of the pair of guides, each travel driving mechanism of the first pair of the travel driving mechanisms being configured to travel independently with one movable opener robot of the first pair of movable opener robots being supported by the each travel driving mechanism, and
a second pair of the travel driving mechanisms disposed on the another guide of the pair of guides, each travel driving mechanism of the second pair of the travel driving mechanisms being configured to travel independently with one movable opener robot of the second pair of movable opener robots being supported by the each travel driving mechanism.

4. The coating system according to claim 2,
further comprising fixed opener robots mounted in the coating booth with the first pair of coating robots disposed between the fixed opener robots in the conveyance direction,
wherein the first movable part is a front openable member disposed at a front portion of the workpiece, one fixed opener robot of the fixed opener robots being configured to operate the front openable member, and
further comprising a rear openable member disposed at a rear portion of the workpiece, another fixed opener robot of the fixed opener robots being configured to operate the rear openable member.

5. The coating system according to claim 4,
wherein the first pair of coating robots is configured to coat a side exposed portion of the workpiece exposed through one side openable member, among the plurality of side openable members, that is opened by one movable opener robot of the first pair of movable opener robots and the second pair of movable opener robots, and
wherein the first pair of coating robots is configured to coat a front exposed portion or a rear exposed portion of the workpiece exposed through the front openable member or the rear openable member opened by the one fixed opener robot or the another fixed opener robot.

6. The coating system according to claim 4, wherein the fixed opener robots are mounted in the coating booth at positions lower than the first pair of coating robots in the height direction.

7. The coating system according to claim 4,
wherein the fixed opener robots are mounted in the coating booth, and
wherein a movable range of the first pair of coating robots in the conveyance direction being between the fixed opener robots.

8. The coating system according to claim 1, wherein the first pair of coating robots includes the first coating robot mounted at a first mounting position, and wherein the first operation robot is mounted at a second mounting position below the first mounting position in the height direction.

9. The coating system according to claim 1,
wherein the first operation robot includes an end effector movable in the height direction between a lowest position and a highest position, and
wherein the first pair of coating robots is provided at a position higher than the highest position of the end effector of the first operation robot.

* * * * *